United States Patent [19]

Plumer

[11] 4,211,128

[45] Jul. 8, 1980

[54] VEHICLE WHEEL LUG NUT APPARATUS

[76] Inventor: Mark J. Plumer, 4265 Marina City Dr., Marina Del Rey, Calif. 90291

[21] Appl. No.: 925,186

[22] Filed: Jul. 17, 1978

[51] Int. Cl.$^2$ .............................................. B25B 13/48
[52] U.S. Cl. ...................... 81/71; 85/32 R; 85/45
[58] Field of Search ............... 81/71, 121 R; 85/32 R, 85/37, 45

[56] References Cited

U.S. PATENT DOCUMENTS

| 641,191 | 1/1900 | Champion | 85/45 X |
|---|---|---|---|
| 2,372,269 | 3/1945 | Golan | 81/121 R |
| 3,274,838 | 10/1966 | Hamilton | 85/45 X |

FOREIGN PATENT DOCUMENTS 110624  4/1964  Czechoslovakia ........................... 81/71

Primary Examiner—James G. Smith
Attorney, Agent, or Firm—Fulwider Patton, Rieber, Lee & Utecht

[57] ABSTRACT

The combination of a vehicle wheel lug nut and a wrench engagable with the nut to apply and remove the nut from a lug stud. The lug nut is formed with a hexagonal recess that receives a complimentary hexagonal wrench. A plurality of splines and grooves are interposed between the abutting surfaces of the recess and the wrench to code the wrench to the nut. This arrangement reduces the liklihood of theft of the vehicle wheel.

7 Claims, 10 Drawing Figures

U.S. Patent  Jul. 8, 1980  Sheet 1 of 2  4,211,128
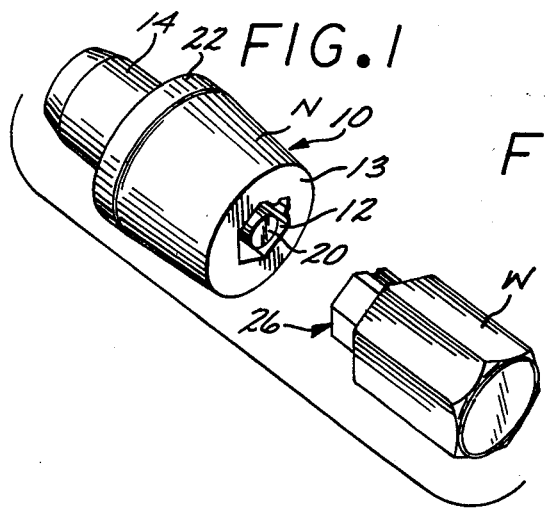
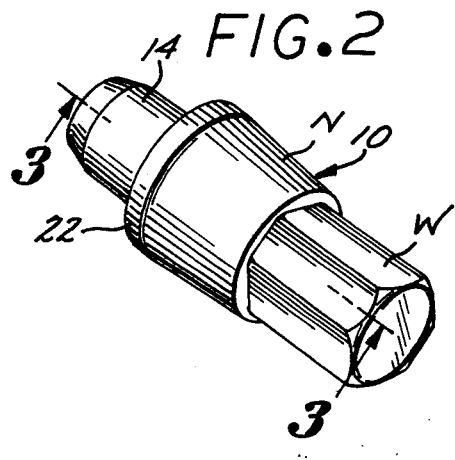
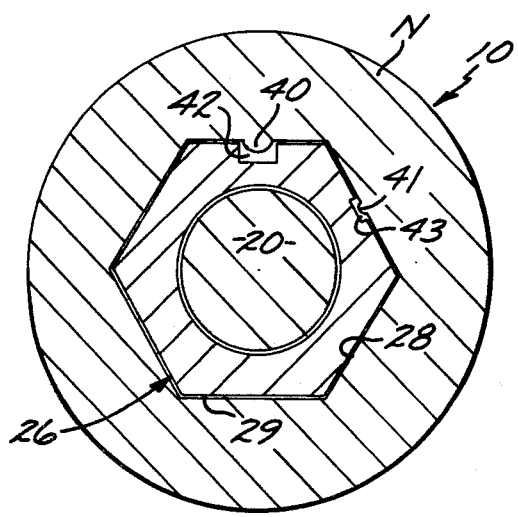
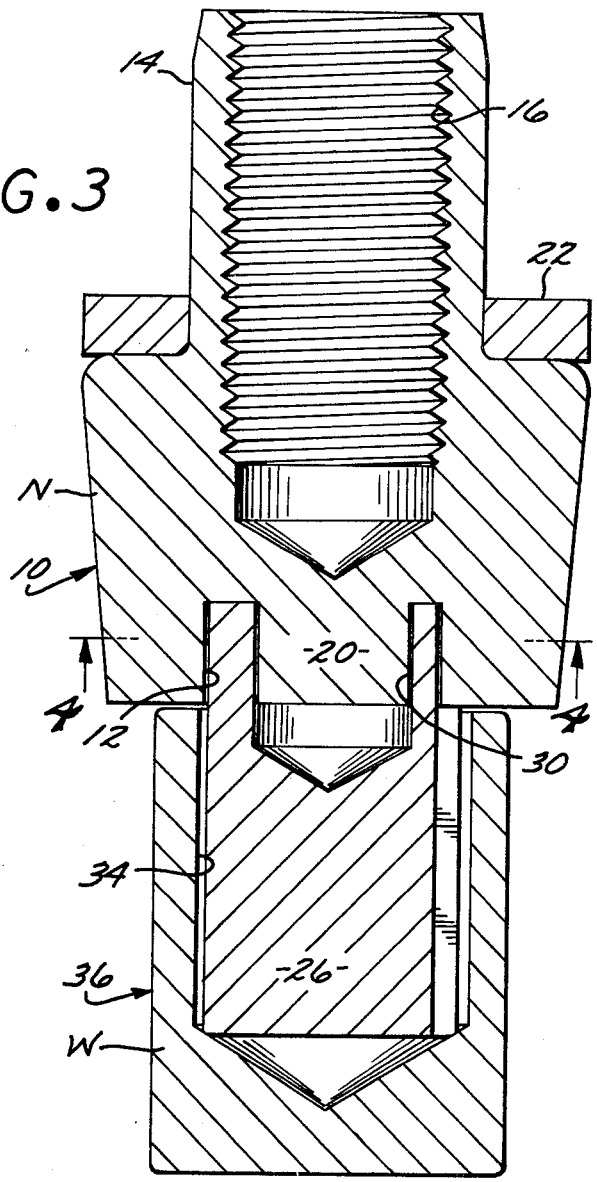
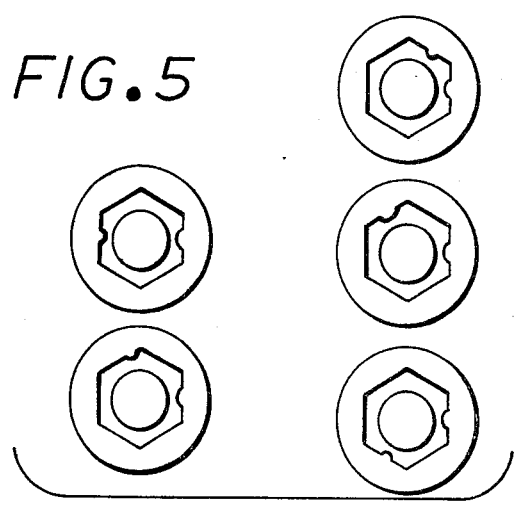

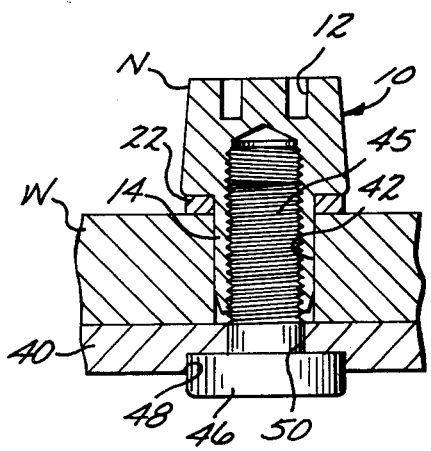
FIG. 6
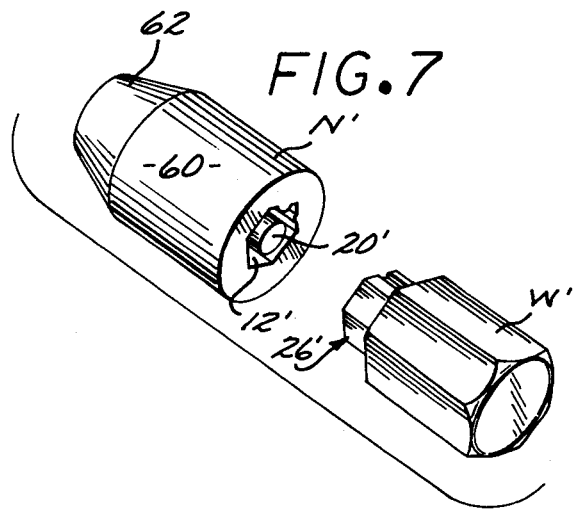
FIG. 7
FIG. 8
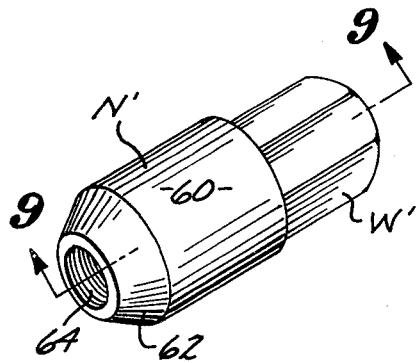
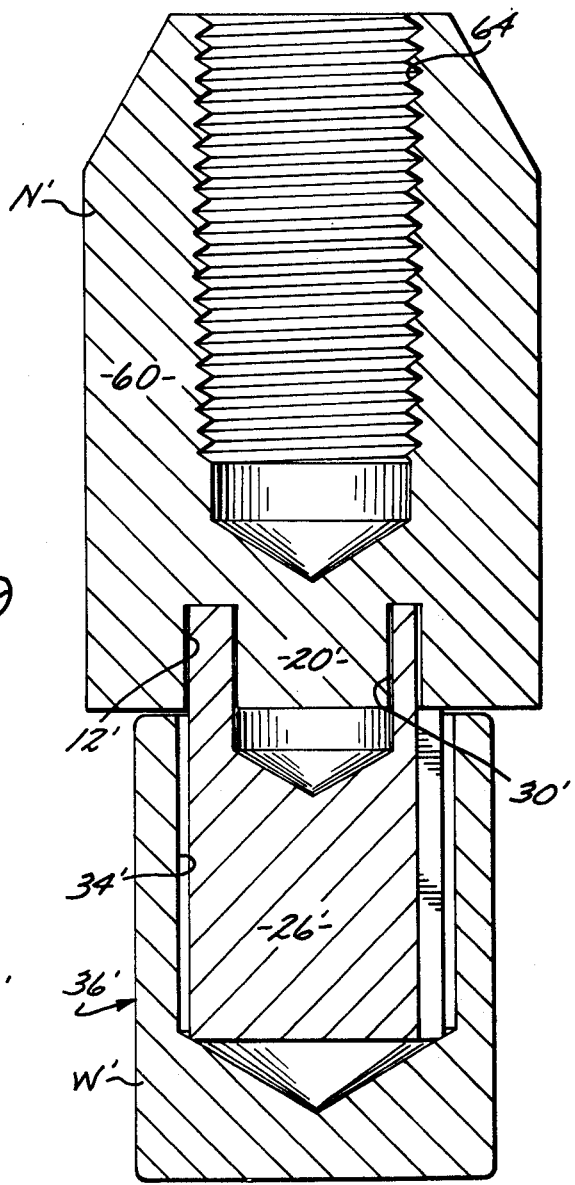
FIG. 9
FIG. 10
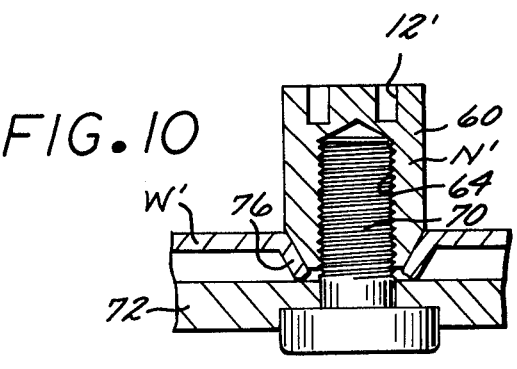

4,211,128

VEHICLE WHEEL LUG NUT APPARATUS

BACKGROUND OF THE INVENTION

It has been heretofore proposed to provide vehicle wheel lug nuts which are coded to a special wrench so as to prevent theft of vehicle wheels. A typical example of heretofore proposed arrangements of this kind is disclosed in U.S. Pat. No. 3,241,408, issued Mar. 22, 1966 to Lewis D. McCauley. This patent discloses a nut formed with a recess having a curvilinearly extending channel that receives a wrench formed with a complimentary flange. Such heretofore proposed arrangements have not been completely practical to manufacture because of the cost of fabricating the curvilinear engaging surfaces of the lock nuts and their wrenches. Moreover, the utilization of such curvilinear surfaces has made it difficult to apply and remove the wrench from the wheel nut, such curvilinear surfaces tending to become jammed. In many cases the wrench would break off inside the nut recess.

SUMMARY OF THE INVENTION

It is a major object of the present invention to provide a theft-preventing vehicle wheel lug nut and wrench apparatus wherein the nut is provided with a coaxial driving recess defined by polygonal straight sides, and the wrench includes a post having straight sides of polygonal configuration complimentary to the recess, with a plurality of axially extending coding spline and grooves being formed between the abutting surfaces of the straight sides of the driving recess and the post. This arrangement permits a wide variation of numbers and positions of splines and grooves providing a large number of possible coded combinations requiring specific complimentary wrenches for removal of the lug nuts. The utilization of the straight sided nut recess and wrench post, also considerably reduces the cost to manufacture of the nut and wrench. Another advantage of the nut and wrench combination of the present invention is that the straight sided configuration of the recess and the post insures easy removability of the wrench from the nut.

It is another advantage of the nut and wrench combination of the present invention that the driving surfaces of the wrench and the nut can be so selected with respect to the configuration of the splines and grooves that the splines and grooves will function solely to code the wrench and the nut. Accordingly, there is little liklihood of damage to the splines and grooves when the nut is rotated by the wrench.

Other objects and advantages of the present invention will become apparent from the following detailed description when taken in conjunction with the accompanying drawings.

BRIEF DESCRIPTION OF THE DRAWINGS

FIG. 1 is an exploded perspective view, showing a preferred form of vehicle lug nut and wrench embodying the present invention;

FIG. 2 is a perspective view similar to FIG. 1, but showing the wrench engaged with the nut;

FIG. 3 is a central sectional view taken in enlarged scale along line 3—3 of FIG. 2;

FIG. 4 is a transverse sectional view taken along line 4—4 of FIG. 3;

FIG. 5 shows a plurality of spline and groove configurations which may be utilized with the nut and wrench apparatus of the present invention;

FIG. 6 is a cross-sectional view taken on a plane through the axis of a wheel mounting stud provided with the lug nut of FIGS. 1-4;

FIG. 7 is an exploded perspective view showing a second form of lug nut embodying the present invention;

FIG. 8 is a perspective view of the lug nut of FIG. 7 engaged with the afore-described wrench;

FIG. 9 is a central sectional view taken along line 9—9 of FIG. 8; and

FIG. 10 is a cross-sectional view taken on a plane through the axis of a wheel mounting stud provided with the lug nut of FIGS. 7, 8 and 9.

DESCRIPTION OF THE PREFERRED EMBODIMENTS

Referring to the drawings, a preferred form of vehicle wheel lug nut and wrench therefore is shown in FIGS. 1-4. The nut member N or threaded fastener of such apparatus includes a generally truncated frusto-conical head, generally designated 10 formed at its outer portion with a driving recess 12 of hexagonal configuration. The outer end of head 10 has a flat surface 13. The inner end of such head 10 merges into an integral neck 14. A threaded blind bore 16 extends through the neck 14 and into the mid-portion of head 10. Such blind bore 16 receives a complimentary bolt or stud (not shown) upon which a vehicle wheel is removably mounted by a plurality of like lug nuts N. An integral coaxial pin 20 of cylindrical configuration extends through the center of recess 12. A flat washer 22 is carried by neck 14.

The wrench member W of the preferred form of apparatus embodying the present invention, is of a generally hexagonal shape and includes a coaxial post, generally designated 26, which is axially insertable within the driving recess 12 of lug nut N to effect rotation of such lug nut. The post 26 has a plurality of straight sides 28 that define a hexagon. Each straight side 28 abuts a complimentary straight side 29 of driving recess 12. Post 26 is formed with a coaxial cavity 30 that is received by the coaxial pin 20 of nut member N when the post is inserted within driving recess 12. Post 26 is rigidly pressed within a cylindrical pocket 34 of a wrenching body generally designated 36. Wrenching body 36 is adapted to be engaged by a conventional tool (not shown) for imparting rotation thereto, as for example a lug wrench or torque wrench.

It is important to note that a plurality of axially extending coding spline and groove means are interposed between two abutting surfaces of the straight sides 29 and 28 of the driving recess 12 and the post 26. Thus referring particularly to FIG. 4, it will be observed that two adjacent straight sides 29 of driving recess 12 are formed with integral splines 40 and 41 received by complimentary grooves 42 and 43, that extend inwardly from the adjacent straight sides 28 of post 26. These splines and grooves serve to code the post 26 of wrench W to the particular driving recess 12 of lug nut N. Accordingly, lug nut N can only be removed by utilization of a properly coded wrench W. It will be understood that a plurality of lug nuts N may be sold in a kit with a single wrench W. It should also be understood that the pattern of the splines and grooves may be take various configurations. By way of example, there are shown in FIG. 5 five lug nuts, each having different patterns of splines and grooves.

Preferably, the tolerances between the straight sides 29 and 28 of the driving recess 12 and the post 26 will be so selected that such straight sides are engaged before the splines and grooves can be engaged. This arrangement insures that the splines and grooves function solely to code the wrench W to its complimentary lug nut N. Accordingly, the danger that the comparatively fragile spline and grooves will be damaged during driving engagement of the wrench W and lug nut N is avoided. Thus, as has been stated in previous sentences, the respective tolerances define at least a first clearance between splines such as 40 and 41 and inner walls of grooves such as 42 and 43. Additionally at least a second clearance is formed between adjacent side edges 28 and 29. As provided, the first clearance between the splines and grooves are greater than the second clearance between adjacent side edges 28 and 29. Finally, it should be noted that the utilization of the straight-sided polygon-shaped driving recess and post permits the afore-described threaded fastener and its wrench to be manufactured by the use of low cost machining processes.

Referring now to FIG. 6, the afore-described lug nut N is shown in assembled relationship with a conventional wheel W and a wheel mounting member 40 to which vehicle wheel W is conventionally secured, such as the rotatable member of a wheel brake unit. Wheel W is formed with a mounting hole 42 through which the neck 14 of lug nut N extends with washer 22 abutting the outer surface of wheel W. Wheel mounting member 40 is provided with a conventional threaded wheel stud 45. The head 46 of which, is secured within a counter bore 48 of wheel mounting member 10, the shank of such stud extending through a bore 50 coaxial with bore 48. It will be understood that lug nut N is rotatably engaged with the threaded lug stud 45 to secure wheel W to wheel mounting member 40 by means of the afore-described wrench W.

Referring now to FIGS. 7-10, there is shown a second form of lug nut N' embodying the present invention, wherein like parts bear primed reference numerals. Lug nut N' includes a cylindrical head 60 formed at its outer portion with a driving recess 12', identical to that described herein before with respect to FIGS. 1-4. The end of head 60 opposite recess 12 is formed with a conical neck 62. A threaded blind bore 64 extends through the neck 62 into the head 60. It will be understood that recess 12' receives the post 26' of a wrench W', identical to that described herein before with respect to FIGS. 1-4.

Referring now to FIG. 10, lug nut N' is adapted for use with a lug stud 70 which is rigidly affixed to a wheel mounting member 72 in a conventional manner. The shank 74 of such lug nut receives the blind bore 64 of lug nut N'. The conical neck 62 of lug nut N' is adapted to be received in a conventional manner by a countersink portion 76 of a conventional wheel W', so as to center the lug nut N' with lug stud 70. It will be apparent that the mode of use of the second form of lug nut N' and its wrench W' is substantially identical to that of the afore-described lug nut N and wrench W. Various modifications and changes may be made with respect to the foregoing detailed description without departing from the spirit of the present invention.

I claim:

1. In combination, a threaded fastener for vehicle wheels having a head formed with a coaxial driving recess defined by polygonal straight sides; a wrench for engagement with said fastener to apply and remove said fastener with respect to a cooperating threaded member, said wrench having a coaxial post axially insertable within said recess to effect rotation of said fastener, said post having straight sides of polygonal configuration complimentary to said recess that drivingly engage said straight sides; and axially extending coding spline and groove means formed between the abutting surfaces of the straight sides of said driving recess and said post, a first clearance between said spline and groove means being greater than a second clearance between adjacent side edges, the straight sides of said post drivingly engaging the straight sides of said recess before said spline and groove means can be engaged whereby said spline and groove means function solely to code said wrench to said fastener.

2. The combination of claim 1, wherein said spline means are formed within said recess to extend into said groove means formed on said post.

3. A combination of claim 1, wherein said fastener is formed with a coaxial pin that is received by a complimentary coaxial cavity formed in said post.

4. A combination of claim 1, wherein said recess and said post are of hexagonal shape.

5. A combination of claim 2, wherein said fastener is formed with a coaxial pin that is received by a complimentary coaxial cavity formed in said post.

6. A combination of claim 2, wherein said recess and said post are of hexagonal shape.

7. A combination of claim 2, wherein said fastener is formed with a coaxial pin that is received by a complimentary coaxial cavity formed in said post.

* * * * *